US011619717B2

(12) United States Patent
Wang et al.

(10) Patent No.: US 11,619,717 B2
(45) Date of Patent: Apr. 4, 2023

(54) LIDAR RECEIVER WITH MOVABLE DETECTOR

(71) Applicant: BEIJING VOYAGER TECHNOLOGY CO., LTD., Beijing (CN)

(72) Inventors: Chao Wang, Mountain View, CA (US); Lingkai Kong, Mountain View, CA (US); Yonghong Guo, Mountain View, CA (US); Wenbin Zhu, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 384 days.

(21) Appl. No.: 16/874,935

(22) Filed: May 15, 2020

(65) Prior Publication Data

US 2021/0356566 A1 Nov. 18, 2021

(51) Int. Cl.
*G01S 7/489* (2006.01)
*G01S 17/931* (2020.01)
*G01S 7/4863* (2020.01)

(52) U.S. Cl.
CPC ............ *G01S 7/4863* (2013.01); *G01S 7/489* (2013.01); *G01S 17/931* (2020.01)

(58) Field of Classification Search
None
See application file for complete search history.

(56) References Cited

U.S. PATENT DOCUMENTS

| 10,222,475 | B2* | 3/2019 | Pacala | G01S 17/42 |
| 10,317,529 | B2* | 6/2019 | Shu | G01S 17/42 |
| 10,444,359 | B2* | 10/2019 | Pacala | G02B 26/10 |
| 10,481,269 | B2* | 11/2019 | Pacala | G01S 7/4817 |
| 10,663,586 | B2* | 5/2020 | Pacala | H01L 31/107 |
| 10,983,197 | B1* | 4/2021 | Zhu | G01S 17/894 |
| 11,105,925 | B2* | 8/2021 | Pacala | G01S 7/497 |
| 11,199,614 | B1* | 12/2021 | Gan | H04N 17/002 |
| 11,385,335 | B2* | 7/2022 | Wu | G01S 17/86 |
| 11,486,985 | B2* | 11/2022 | Wang | G01S 7/4876 |
| 11,500,073 | B2* | 11/2022 | Wang | G01S 7/486 |
| 11,500,074 | B2* | 11/2022 | Lu | G01S 7/4868 |
| 11,561,289 | B2* | 1/2023 | Zhou | G02B 5/04 |
| 2018/0329065 | A1* | 11/2018 | Pacala | H01L 27/1446 |
| 2019/0086542 | A1* | 3/2019 | Kubota | G01S 7/4865 |
| 2019/0179028 | A1* | 6/2019 | Pacala | G01S 7/4865 |
| 2020/0011732 | A1* | 1/2020 | Dutton | G01J 1/0271 |
| 2021/0349192 | A1* | 11/2021 | Wang | G01S 17/931 |
| 2021/0356566 | A1* | 11/2021 | Wang | G01S 7/4817 |
| 2022/0099839 | A1* | 3/2022 | Morelli | G02B 27/283 |

* cited by examiner

*Primary Examiner* — Irfan Habib
(74) *Attorney, Agent, or Firm* — Bayes PLLC

(57) ABSTRACT

Embodiments of the disclosure provide a receiver in an optical sensing system. The exemplary receiver includes a movable detector configured to receive optical signals reflected or scattered from an object scanned by the optical sensing system. The receiver further includes an actuator configured to move the movable detector. The receiver also includes a controller configured to determine a plurality of target positions of the movable detector for receiving the optical signals. The controller is further configured to control the actuator to move the movable detector to the plurality target positions according to a movement pattern.

18 Claims, 5 Drawing Sheets

LIDAR RECEIVER WITH MOVABLE DETECTOR

TECHNICAL FIELD

The present disclosure relates to optical sensing systems such as a light detection and ranging (LiDAR) system, and more particularly to, a receiver with a movable detector for receiving optical signals in such an optical sensing system.

BACKGROUND

Optical sensing systems such as LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor such as a detector or a detector array. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

The pulsed laser light beams emitted by a LiDAR system are typically directed to multiple directions to cover a field of view (FOV). As a result, LiDAR system requires a receiver that can receive the returned light signals from different directions. To realize this receiving requirement, most LiDAR systems implement one of two designs: (1) a rotational mirror to deflect the return light signals so that they are all received by a static detector, or (2) using an array of detectors to receive the returned light signals within an range of directions.

The performance of the conventional detector arrays, however, is limited in two aspects. First, in the detector array, there are typically gaps between the sensor elements, which cause a signal loss. Secondly, the detector array employs a high-speed electrical switch to switch the signal among the different sensor elements. This not only increases a design complexity, but also limits the scanning speed, as the switching speed is limited by the response speed of the electrical switches. As a result, receivers with conventional detector arrays face the two-folded issues of signal loss and limited speed.

Embodiments of the disclosure improve the performance of optical sensing systems such as LiDAR systems by providing an improved receiver with a movable detector.

SUMMARY

Embodiments of the disclosure provide a receiver in an optical sensing system. The exemplary receiver includes a movable detector configured to receive optical signals reflected from an object scanned by the optical sensing system. The receiver further includes an actuator configured to move the movable detector. The receiver also includes a controller configured to determine a plurality of target positions of the movable detector for receiving the optical signals. The controller is further configured to control the actuator to move the movable detector to the plurality target positions according to a movement pattern.

In some embodiments, the optical sensing system is a Light Detection and Ranging (LiDAR) system and each optical signal is a laser beam reflected or scattered by the object. In some embodiments, the receiver further includes a beam converging device configured to focus the laser beams to the respective target positions. In some embodiments, the movable detector is one of an avalanche photodiode (APD), a single photon avalanche diode (SPAD), or a silicon photomultipliers (SiPM). In some embodiments, the actuator is a piezoelectric actuator or a high-speed motor.

In some embodiments, the plurality of target positions are distributed within a physical range determined according to a field of view of the receiver. For example, the target positions are distributed equidistantly in the physical range. In some embodiments, the actuator is configured to move the movable detector to the plurality of target positions unidirectionally from a first end of the physical range to a second end of the physical range. In some embodiments, the plurality of target positions are distributed in a two-dimensional plane and the actuator is configured to move the movable detector in the two-dimensional plane.

Embodiments of the disclosure also provide a method for receiving optical signals in an optical sensing system. The exemplary method includes determining, by a controller, a plurality of target positions of a movable detector for receiving optical signals reflected or scattered from an object scanned by the optical sensing system. The method further includes moving, by an actuator controlled by the controller, a movable detector to a first target position among the plurality of target positions. The method also includes receiving, by the movable detector, a first optical signal at the first target position. The method further includes moving, by the actuator controlled by the controller, the movable detector to a second target position among the plurality of target positions. The method additionally includes receiving, by the movable detector, a second optical signal at the second target position.

Embodiments of the disclosure further provide an optical sensing system. The optical sensing system includes a transmitter configured to emit optical signals in a plurality of directions to scan an object. The optical sensing system further includes a receiver configured to detect optical signals reflected or scattered by the object. The receiver includes a movable detector configured to receive the reflected optical signals. The receiver further includes an actuator configured to move the movable detector. The receiver also includes a controller configured to control the actuator to move the movable detector to a plurality target positions for receiving the reflected optical signals.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods for receiving optical signals in an optical sensing system (e.g., a LiDAR system) using a movable detector driven by an actuator. For example, the movable detector can be driven by a piezoelectric actuator or a high-speed motor to move to multiple positions, thereby receiving optical signals in different directions. In some embodiments, the multiple detector positions can be predetermined, e.g., to resemble the positions of the senor elements in a conventional detector array. For example, the multiple detector positions can be distributed equidistantly. In some embodiments, the multiple detector positions may be adaptively determined by a controller. For example, the detector positions may be determined based on the estimated return directions of the optical signals after they are emitted to an object and reflected or scattered from that object. By using a single movable detector, electrical switching among different sensor element in a detector array is eliminated.

The movement pattern of the movable detector may be determined based on the scanning pattern of the optical sensing system (e.g., scanning FOV of the transmitter). In some embodiments, the movable detector can be moved in a physical range determined according to the receiver FOV of the optical sensing system. The movement of the movable detector can be one-dimensional (1D), for 1D scanning, or two-dimensional (2D), for 2D scanning. In some embodiments, the movable detector may travel unidirectionally between the two ends of the physical range, therefore visiting the determined detector positions consecutively. In some embodiments, the moving speed of the movable detection may be determined based on the scanning speed of the transmitter. By moving through the entire physical range, the movable detector leaves essentially no gaps, thus reducing signal loss.

Embodiments of the present disclosure therefore improve the performance and simplify the design of an optical sensing system, which can be used in many applications. For example, the improved optical sensing system can be used in advanced navigation technologies, such as to aid autonomous driving or to generate high-definition maps, in which the optical sensing system can be equipped on a vehicle.

Figure 1:
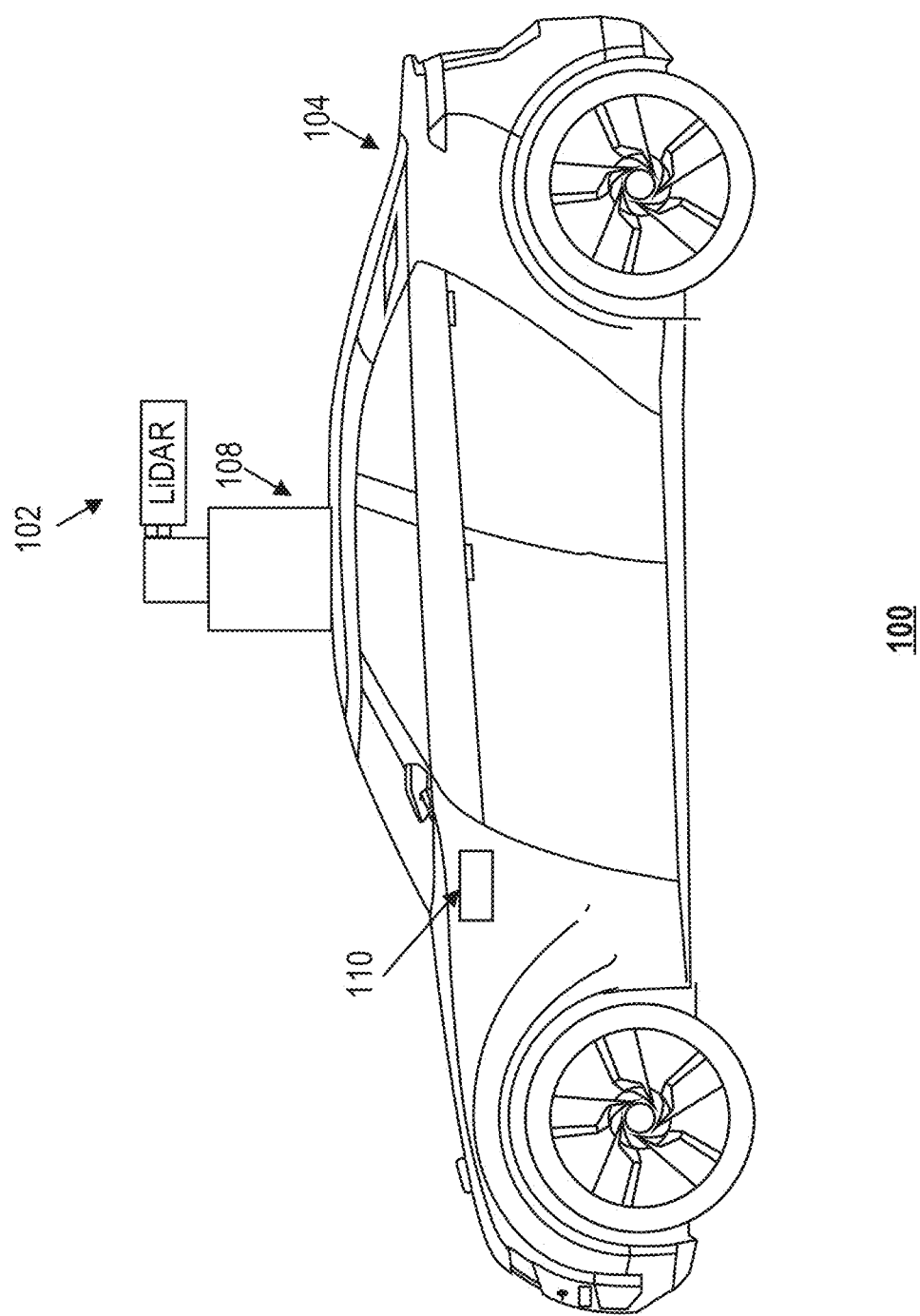
FIG. 1 illustrates a schematic diagram of an exemplary vehicle equipped with a LiDAR system, according to embodiments of the disclosure.

For example, FIG. 1 illustrates a schematic diagram of an exemplary vehicle 100 equipped with an optical sensing system (e.g., a LiDAR system) 102 (hereinafter also referred to as LiDAR system 102), according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with LiDAR system 102 mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a transmitter of LiDAR system 102 may be configured to scan the surrounding environment. LiDAR system 102 measures distance to a target by illuminating the target with a pulsed laser beam and measuring the reflected/scattered pulses with a receiver. The laser beam used for LiDAR system 102 may be ultraviolet, visible, or near infrared. In some embodiments of the present disclosure, LiDAR system 102 may capture point clouds including depth information of the objects in the surrounding environment. As vehicle 100 moves along the trajectory, LiDAR system 102 may continuously capture data. Each set of scene data captured at a certain time range is known as a data frame.

Figure 2:
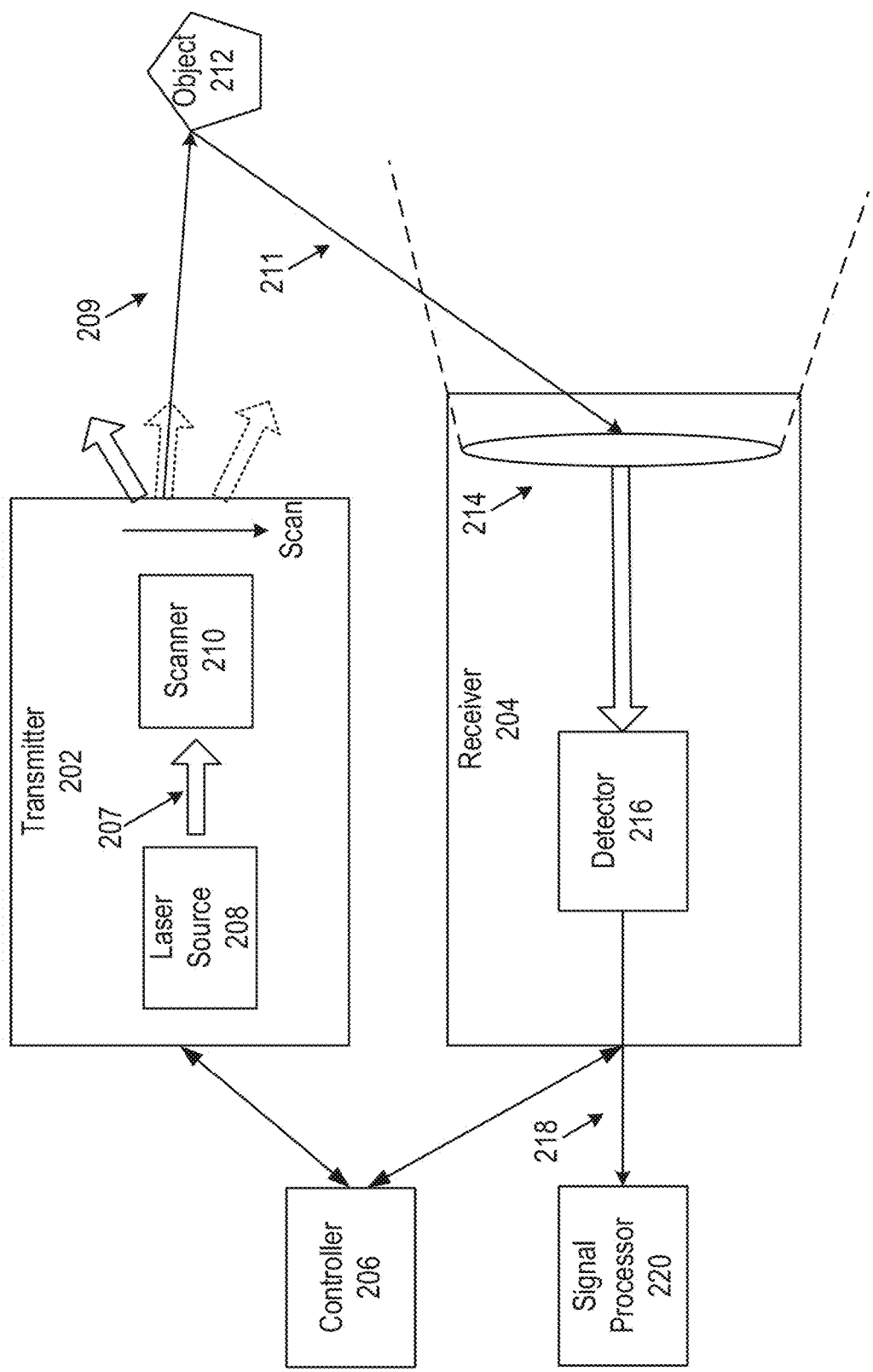
FIG. 2 illustrates a block diagram of an exemplary LiDAR system, according to embodiments of the disclosure.

FIG. 2 illustrates a block diagram of an exemplary LiDAR system 102, according to embodiments of the disclosure. LiDAR system 102 may include a transmitter 202, a receiver 204, and a controller 206. Transmitter 202 may emit optical signals (e.g., laser beams) along multiple directions. Transmitter 202 may include one or more laser sources 208 and a scanner 210. Transmitter 202 can sequentially emit a stream of pulsed laser beams in different directions within a scan FOV (e.g., a range in angular degrees), as illustrated in FIG. 2. Laser source 208 may be configured to provide a laser beam 207 (also referred to as "native laser beam") to scanner 210. In some embodiments of the present disclosure, laser source 208 may generate a pulsed laser beam in the ultraviolet, visible, or near infrared wavelength range.

In some embodiments of the present disclosure, laser source 208 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, or 848 nm. It is understood that any suitable laser source may be used as laser source 206 for emitting laser beam 207.

Scanner 210 may be configured to emit a laser beam 209 to an object 212 in a range of directions (collectively forming the FOV of transmitter 202). Object 212 may be made of a wide range of materials including, for example, non-metallic objects, rocks, rain, chemical compounds, aerosols, clouds and even single molecules. The wavelength of laser beam 209 may vary based on the composition of object 212. In some embodiments, at each time point during the scan, scanner 210 may emit laser beam 209 to object 212 in a direction within a range of scanning angles by rotating a deflector, such as a micromachined mirror assembly. In some embodiments, scanner 210 may also include optical components (e.g., lenses, mirrors) that can collimate pulsed laser light into a narrow laser beam to increase the scan resolution and the range to scan object 212.

In some embodiments, receiver 204 may be configured to detect a returned laser beam 211 returned from object 212. The returned laser beam 211 may be in a different direction from beam 209. Receiver 204 can collect laser beams returned from object 212 and output electrical signals reflecting the intensity of the returned laser beams. Upon contact, laser light can be reflected/scattered by object 212 via backscattering, such as Rayleigh scattering, Mie scattering, Raman scattering, and fluorescence. As illustrated in FIG. 2, receiver 204 may include a lens 214 and a detector 216. Lens 214 may be configured to collect light from a respective direction in the receiver field of view (FOV) and converge the light beam to focus on detector 216. At each time point during the scan, returned laser beam 211 may be collected by lens 214. Returned laser beam 211 may be returned from object 212 and have the same wavelength as laser beam 209.

Detector 216 may be configured to detect returned laser beam 211 returned from object 212 and converged by lens 214. In some embodiments, detector 216 may convert the laser light (e.g., returned laser beam 211) converged by lens 214 into an electrical signal 218 (e.g., a current or a voltage signal). Electrical signal 218 may be generated when photons are absorbed in a photodiode included in detector 216. In some embodiments, detector 216 may include a PIN detector, an avalanche photodiode (APD) detector, a single photon avalanche diode (SPAD) detector, a silicon photo multiplier (SiPM) detector, or the like.

Electrical signal 218 may be transmitted to a data processing unit, e.g., signal processor 220 of LiDAR system 102, to be processed and analyzed. For example, signal processor 220 may determine the distance of object 212 from LiDAR system 102 based on electrical signal 218 and data of laser beam 209. In some embodiments, signal processor 220 may be part of controller 206.

Controller 206 may be configured to control transmitter 202 and/or receiver 204 to perform detection/sensing operations. In some embodiments, controller 206 may dynamically adjust the laser emission scheme of transmitter 202, such as its scanning FOV, power, speed, and wavelength. For example, controller 206 may control the rotation of the deflector inside transmitter 202 to adjust the scanning angles. In some embodiments, controller 206 may further adjust the laser receiving scheme of receiver 204 to receive the returned laser beams. In some embodiments of the present disclosure, detector 216 may be a movable detector and controller 206 may control an actuator to move detector 216 to different positions to receive laser beams returned from different directions.

Figure 3:
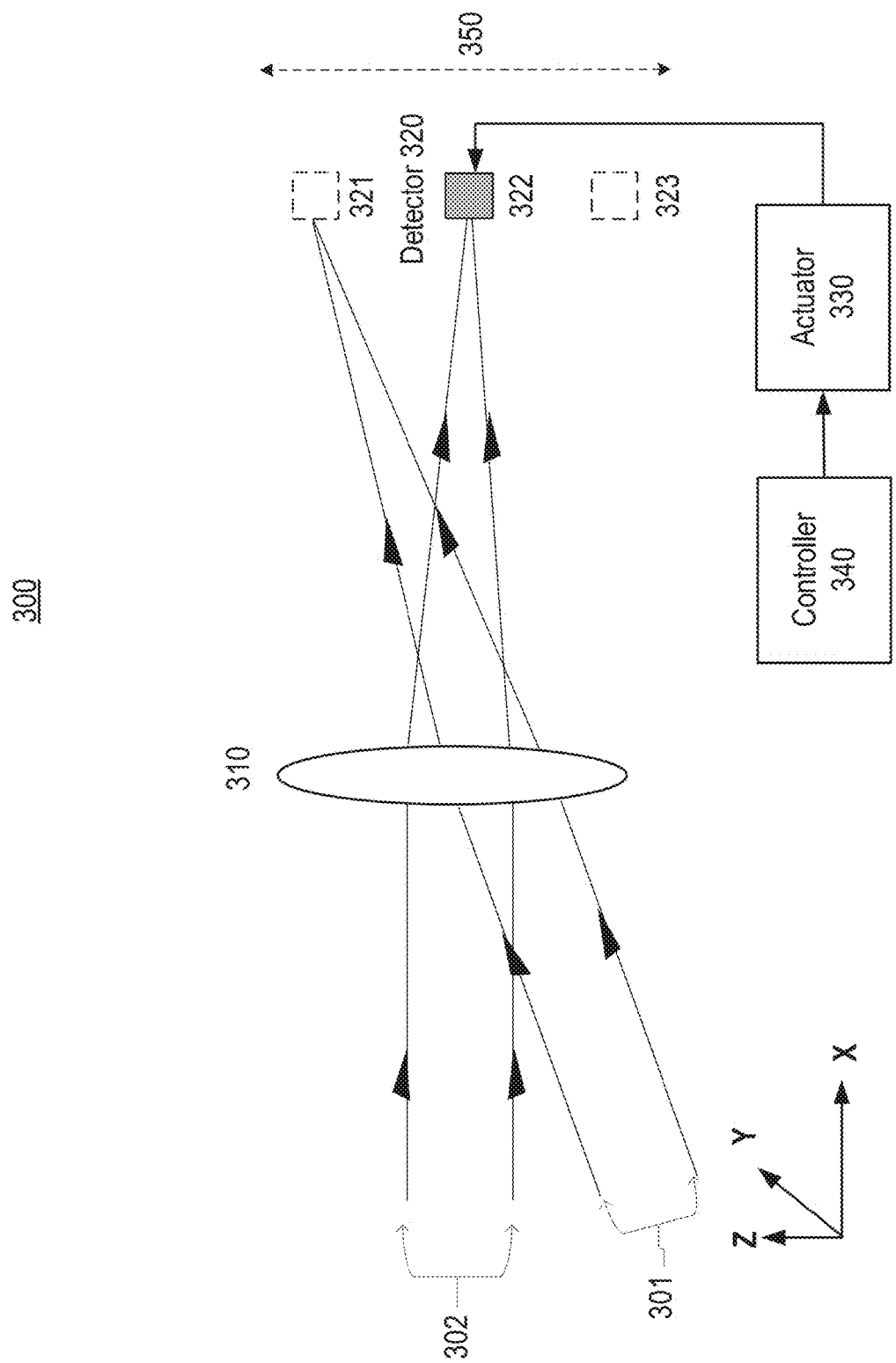
FIG. 3 illustrates a schematic diagram of an exemplary LiDAR receiver with a movable detector, according to embodiments of the disclosure.

For example, FIG. 3 illustrates a schematic diagram of an exemplary LiDAR receiver 300 with a movable detector, according to embodiments of the disclosure. As shown by FIG. 3, LiDAR receiver 300 may include a converging device such as lens 310, a movable detector 320, and an actuator 330, which is controlled by controller 340.

In some embodiments, laser beams may be returned from different directions. Those directions (or angles) collectively form the field of view (FOV) of receiver 300. For example, FIG. 3 shows two laser beams, laser beam 301 and laser beam 302, returned from different angles. It is contemplated that receiver 300 may receive more laser beams from different directions. The returned laser beams may be first focused by the converging device, e.g., lens 310.

In some embodiments, lens 310 may be a prism lens focusing the returned laser beams onto movable detector 320. Lens 310 may be a transparent optical element with flat, polished surfaces that refract light. At least two of the flat surfaces have an angle between them. The exact angle between the surfaces decides the refraction angle and can be selected depending on the application. Lens 310 can be made from any material that is transparent to the wavelengths for which they are designed. Typical materials include glass, plastic, and fluorite. In some embodiments, lens 310 may be placed into a lens holder and fixed to receiver 300. Lens 310 may be placed at a focal length away from movable detector 320 so that the laser beams can be focused onto movable detector 320. For example, laser beam 301 is focused to position 321 and laser beam 302 is focused to position 322 by lens 310. In some embodiments, location of lens 310 may also be adjustable in order to keep the laser beams in focus.

In some embodiments, movable detector 320 may be any sensor element suitable for detecting light beams and convert the optical signal to an electrical signal. For example, movable detector 320 may be a PIN detector, an APD detector, a SPAD detector, a SiPM detector, or the like. A PIN photodiode is a diode with a wide, undoped intrinsic semiconductor region between a p-type semiconductor and an n-type semiconductor region. The PIN photodiode operates under a high-level injection, which results in faster operation and therefore it is suitable as a photodetector for high frequency operations. An APD detector is a semiconductor-based photodetector that is operated with a relatively high reverse voltage (typically tens or even hundreds of volts), sometimes just below breakdown. It is highly sensitive as its gain varies strongly with the applied reverse bias and temperature. A SPAD is an avalanche photodiode where a photo-generated carrier can trigger a short-duration but relatively large avalanche current (known as impact ionization). Unlike an APD, the SPAD is specifically designed to operate with a reverse-bias voltage well above the breakdown voltage (known as the Geiger-mode). A SiPM is a solid-state single-photon-sensitive device that implements SPADs on a common silicon substrate. Every SPAD in SiPM operates in Geiger-mode and is coupled with the others by a metal or polysilicon quenching resistor.

In some embodiments, receiver 300 may further include electrical circuitry that converts or otherwise processes the electrical signal generated by movable detector 320. For example, the electrical circuitry may be formed as an integrated circuit on an electronic circuit board (e.g., PCB board). In some embodiments, the electrical circuitry may be attached to movable detector 320 and move along with movable detector 320. By using a movable detector, rather than a detector array, to capture the laser beams returned from different directions, the disclosed design effectively eliminates the need of electrical switching in order to collect and convert the electrical signal at the various sensing elements.

In some embodiments, movable detector 320 may be actuated by actuator 330. Actuator 330 may be directly or indirectly coupled to movable detector 320 in order to apply forces to propel the physical movement of movable detector 320. In some embodiments, actuator 330 may be a piezoelectric actuator, e.g., a unimorph or a bimorph. For example, a bimorph consists of two piezoelectric layers. When voltage is applied to the bimorph, one piezoelectric layer contracts and other expands, causing the bimorph to bend, thus acting as a micromechanical linear actuator to movable detector 320. Compared to a bimorph, a unimorph consists of one piezoelectric layer and a non-piezoelectric (e.g., elastic) layer. Deformation in the piezoelectric layer is induced by the application of a voltage, and similarly provides the bending displacement to actuate movable detector 320.

In some embodiments, actuator 330 may be a high-speed motor. An electric motor operates through the interaction between the motor's magnetic field and electric current in a wire winding to generate force in the form of torque applied on the motor's shaft. The motor can be AC or DC powered, brushed or brushless, single-phase, two-phase, or three-phase, synchronous or asynchronous, fixed-speed or variable-speed. In some embodiments, actuator 330 may be a universal motor that is compact and high speed. Speed of a motor is the magnitude of the rotational velocity of the motor shaft. In some embodiments, the high speed motor can be designed by optimizing wire winding or reducing rotor weight to reduce the inertial.

In some embodiments, actuator 330 may be controlled by controller 340 to actuate movable detector 320. Controller 340 may include components (not shown) such as a communication interface, a processor, a memory, and a storage for performing various control functions. In some embodiments, controller 340 may have different modules in a single device, such as an integrated circuit (IC) chip (implemented as, for example, an application-specific integrated circuit (ASIC) or a field-programmable gate array (FPGA)), or separate devices with dedicated functions. In some embodiments, the processor may include any appropriate type of general-purpose or special-purpose microprocessor, digital signal processor, or microcontroller. The memory or storage may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. For example, the memory and/or the storage may be configured to store program(s) that may be executed by the processor to control the actuation of movable detector 320 by actuator 330.

In some embodiments, LiDAR system 102 may perform 1D scans and accordingly, movable detector 320 may be moved in a dimension perpendicular to the direction of the returned laser beams. For example, as shown in FIG. 3, the direction of the returned laser beams is the X-direction. Accordingly, movable detector 320 may move up or down in the Z-direction. For example, movable detector 320 may be moved to target positions 321, 322, and 323 along the Z-direction. The target positions may be those positions to which the returned laser beams are focused by lens 310.

In some embodiments, controller 340 may be configured to determine a physical range in which movable detector 320 can be moved. For example, as shown in FIG. 3, movable detector 320 can move within a physical range 350. The physical range may be determined according to the FOV of receiver 300, i.e., a range of directions in which the laser beams return, and the focal length of lens 310. In some embodiments consistent with the present disclosure, the focal length of lens 310 may be selected relatively short such that physical range 350 is relatively short.

In some embodiments, the target positions may be predetermined by controller 340 within the physical range. For example, the target positions may resemble the positions of a conventional detector array. In some embodiments, the target positions may be distributed equidistantly within the physical range. In some alternative embodiments, the target positions may be adaptively determined by controller 340 according to scanning parameters used by transmitter 202. For example, controller 340 may estimate the directions of the returned laser beams based on the directions of the laser beams emitted by transmitter 202. Based on the estimated return directions and the focal length, controller 340 may further determine the target positions.

In some embodiments, controller 340 may further determine a movement pattern for movable detector 320 within the physical range. For example, controller 340 may determine the movement pattern based on the scanning pattern used by transmitter 202, including, e.g., the scanning angles used and the order in which laser beams are emitted in those scanning angles. In some embodiments, transmitter 202 may emit laser beams at scanning angles that increase sequentially. Accordingly, movable detector 320 may be moved unidirectionally, e.g., from upper end to the lower end or from the lower end to the upper end, in the physical range. For example, movable detector 320 may be moved from target position 321, to target position 322, and then to target position 323, or in a reverse order. In some embodiments, controller 340 may instruct actuator 330 to move movable detector 320 at a constant speed or a variable speed. The moving speed may be determined, e.g., based on the scanning speed of transmitter 202.

In some embodiments, LiDAR system 102 may perform 2D scans and accordingly, movable detector 320 may be moved in a 2D plane perpendicular to the direction of the returned laser beams. For example, as shown in FIG. 3, the direction of the returned laser beams is the X-direction. Accordingly, movable detector 320 may move in the Y-Z plane. Similarly, controller 340 may be configured to determine a physical range in each dimension (e.g., Y-direction and Z-direction) within which movable detector 320 can be moved, according to the 2D FOV of receiver 300 and the focal length of lens 310. Controller 340 may also determine the target positions for movable detector 320 distributed in the 2D plane. For example, FIG. 4 illustrates a section view of an exemplary 2D distribution of target positions of a movable detector, according to embodiments of the disclosure.

Figure 4:
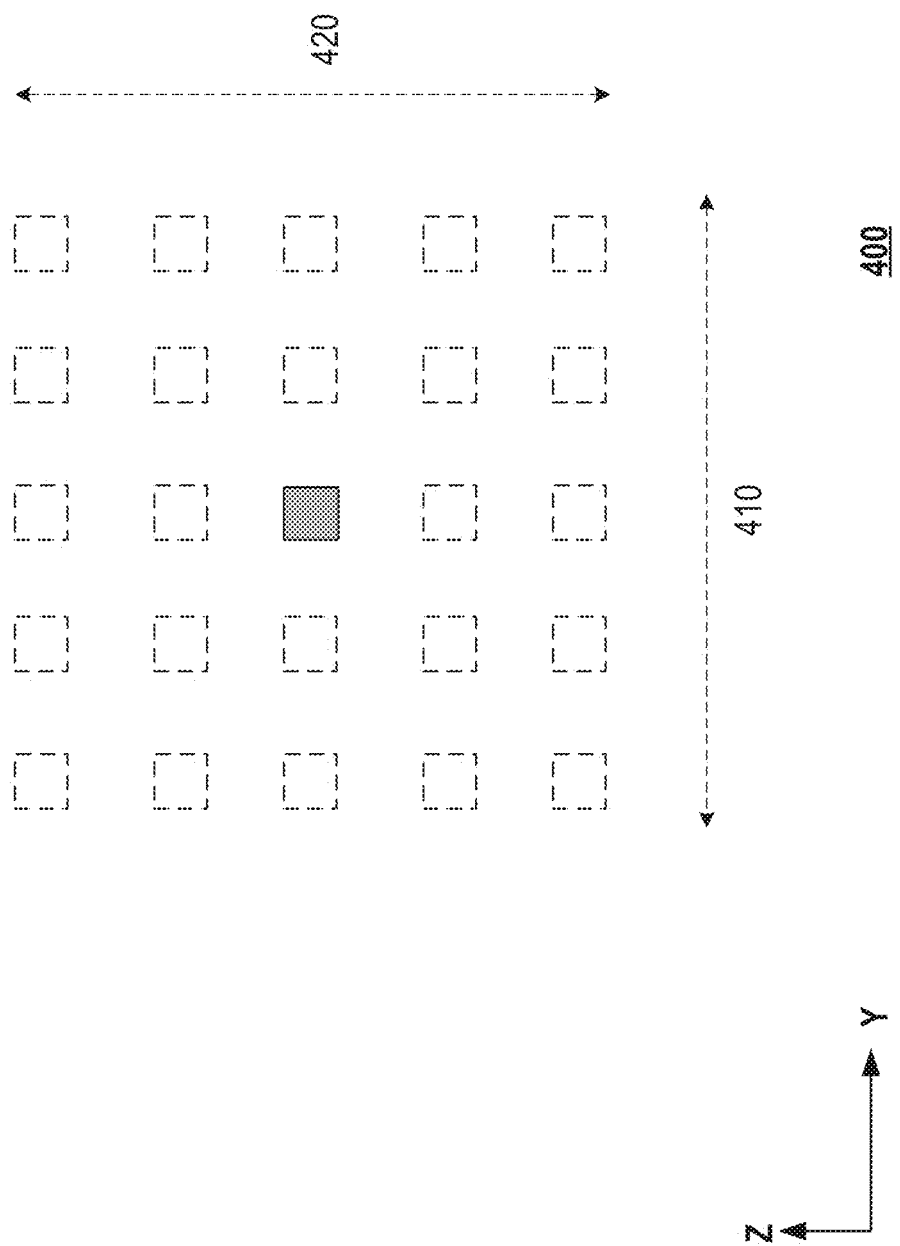
FIG. 4 illustrates a section view of an exemplary 2D distribution of target positions of a movable detector, according to embodiments of the disclosure.

As shown in FIG. 4, movable detector 320 may move within a 2D plane (e.g., the Y-Z plane). Controller 340 may be configured to determine a physical range 410 in the Y-direction and a physical range 420 in the Z-direction. Target positions for movable detector 320 to receive returned laser beams may be distributed in 2D within physical ranges 410 and 420. The target positions may be arranged in a 2D array 400 with N rows and M columns. For example, FIG. 4 shows 2D array 400 as a 5×5 array, although other values can be selected for N and M. Controller 340 may further determine a 2D movement pattern for movable detector 320 to go through these target positions in an order. Again, the movement pattern may be determined based on the scanning pattern used by transmitter 202. For example, movable detector 320 may be actuated to go through the target positions row by row, column by column, in a zig-zag pattern, or the like.

Figure 5:
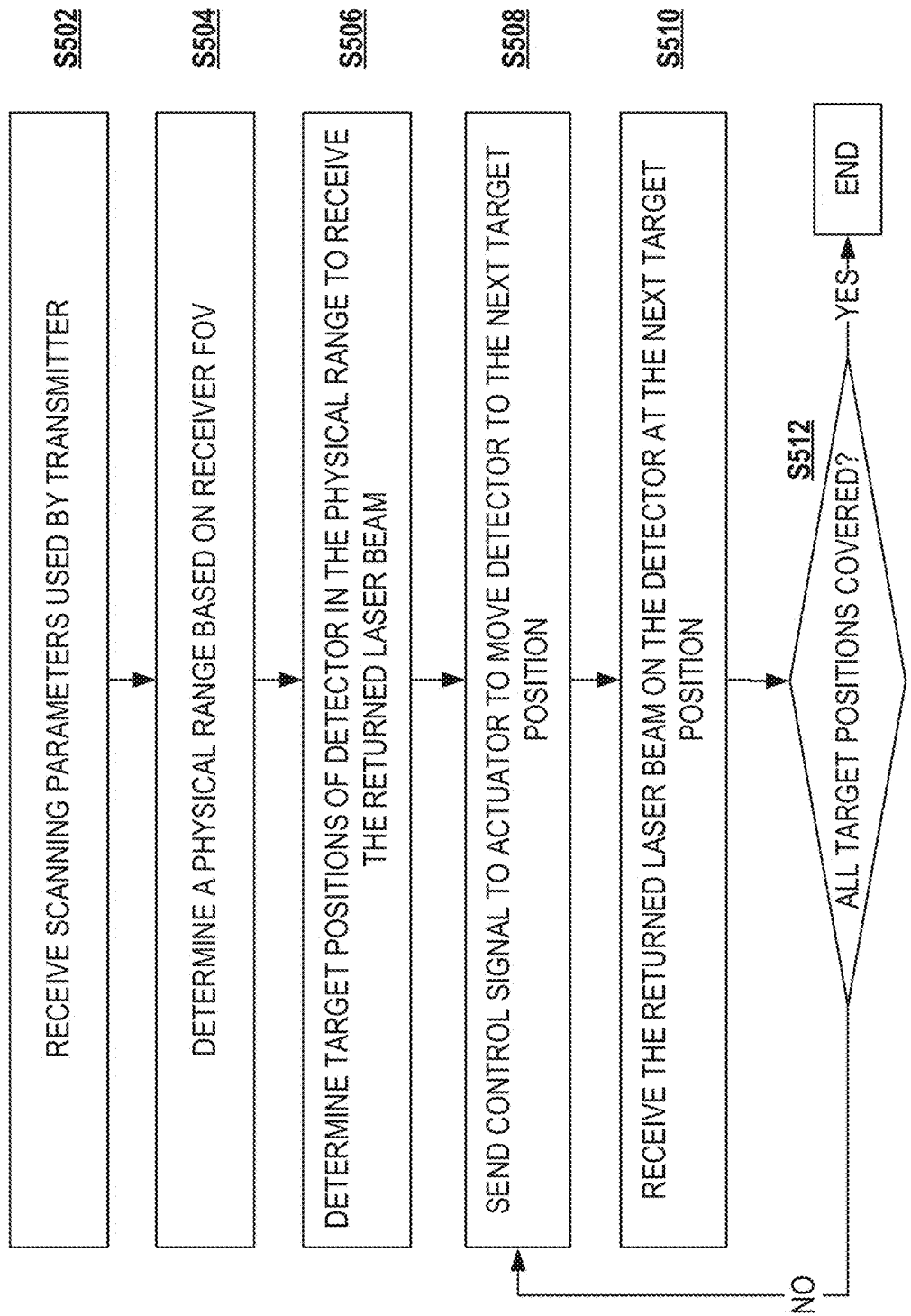
FIG. 5 is a flow chart of an exemplary method for receiving optical signals using a LiDAR receiver with a movable detector, according to embodiments of the disclosure.

FIG. 5 is a flow chart of an exemplary method 500 for receiving optical signals using a LiDAR receiver with a movable detector, according to embodiments of the disclosure. In some embodiments, method 500 may be performed by various components of LiDAR receiver 300, e.g., lens 310, movable detector 320, actuator 330, and controller 340. In some embodiments, method 500 may include steps S502-512. It is to be appreciated that some of the steps may be optional. Further, some of the steps may be performed simultaneously, or in a different order than shown in FIG. 5.

In step S502, controller 340 may receive scanning parameters used by transmitter 202. In some embodiments, controller 340 may be the same controller that determine the scanning parameters and therefore have the parameters saved in its memory/storage. The scanning parameters may include, e.g., scanning FOV of transmitter 202, wavelength of the laser beams, scanning pattern (e.g., scanning angles the laser beams are emitted and the order in which laser beams are emitted in those scanning angles), scanning speed (e.g., tilting speed of the deflector between two scanning angles), etc.

In step S504, controller 340 may determine a physical range for movable detector 320 to cover in order to receive the returned laser beams. In some embodiments, the physical range may be determined based on the FOV of receiver 300. In some embodiments, the receiving FOV of receiver 300 (e.g., covering the estimated directions of the returned laser beams) may be adaptively determined based on the scanning FOV of transmitter 202. For example, physical range 350 (for 1D scans) or physical ranges 410 and 420 (for 2D scans) may be determined by controller 340.

In step S506, controller 340 may determine the target positions for movable detector 320 in the physical range for receiving the returned laser beams. In some embodiments, the target positions may be predetermined by controller 340 within the physical range. For example, the target positions may be distributed equidistantly within the physical range. Alternatively, the target positions may be adaptively determined by controller 340 according to scanning parameters used by transmitter 202. For example, controller 340 may determine the target positions based on the estimated directions of the returned laser beams and the focal length of lens 310. In some embodiments, controller 340 may determine the target positions as a 2D array in a plane, e.g., as shown in FIG. 4.

In some embodiments, in step S506, controller 340 may further determine a movement pattern for moving movable detector 320 to the target positions. For example, controller 340 may determine the movement pattern based on the scanning pattern used by transmitter 202. In some embodiments, controller 340 may determine a movement pattern to move movable detector 320 unidirectionally, e.g., from upper end to the lower end or from the lower end to the upper end, in the physical range. In some embodiments, controller 340 may determine a movement pattern to move movable detector 320 row by row, column by column, or in a zig-zag pattern in a 2D plane. In some embodiments, controller 340 may further determine a moving speed, e.g., based on the scanning speed of transmitter 202.

In step S508, controller 340 may send a control signal to actuator 330 to move movable detector 320 to the next target position. For example, actuator 330 may move movable detector 320 to target position 321. In some embodiments, an electronic circuit board attached to movable detector 320 may move with it. In step S510, movable detector 320 may receive the returned laser beam at the next target position, e.g., target position 321. Movable detector 320 may convert the optical signal to an electrical signal. The electrical signal may be further converted or processed by the electrical circuitry on the electronic circuit board attached to movable detector 320, before being sent to signal processor 220. In Step S512, controller 340 may determine whether movable detector 320 has gone through all the target positions determined in step S506, and if not (S512: NO), method 500 returns to S508 so that movable detector 320 moves to the next target position. Steps S508 and S510 may be repeated until movable detector 320 goes through all the target positions determined in step S506 according to the movement pattern (S512: YES), after which method 500 concludes.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects. Movable detectors other than those disclosed above may also be used. For example, the detector may be a camera or any other sensor suitable for capturing the optical signals used by the respective optical sensing systems.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A receiver in an optical sensing system, the receiver comprising:
   a movable detector configured to receive optical signals reflected or scattered from an object scanned by the optical sensing system;
   an actuator configured to move the movable detector; and
   a controller configured to:
      determine a plurality of target positions distributed within a physical range in a plane transverse to the optical signals according to a field of view of the receiver for receiving the optical signals; and
      control the actuator to move the movable detector to the plurality target positions in the transverse plane according to a movement pattern.

2. The receiver of claim 1, wherein the optical sensing system is a Light Detection and Ranging (LiDAR) system and each optical signal is light reflected or scattered by the object.

3. The receiver of claim 2, wherein the receiver further comprises a beam converging device configured to focus the light to the respective target positions.

4. The receiver of claim 1, wherein the movable detector is one of an avalanche photodiode (APD), a single photon avalanche diode (SPAD), or a silicon photomultipliers (SiPM).

5. The receiver of claim 1, wherein the actuator is a piezoelectric actuator or a high-speed motor.

6. The receiver of claim 1, wherein the target positions are distributed equidistantly in the physical range.

7. The receiver of claim 1, wherein the actuator is configured to move the movable detector to the plurality of target positions unidirectionally from a first end of the physical range to a second end of the physical range.

8. The receiver of claim 1, wherein the plurality of target positions are distributed in a two-dimensional plane and the actuator is configured to move the movable detector in the two-dimensional plane.

9. The receiver of claim 1, wherein the receiver further includes an electronic circuit board attached to the movable detector, wherein the electronic circuit board moves with the movable detector.

10. The receiver of claim 1, wherein the controller is further configured to:
 determine directions of the optical signals; and
 determine the target positions of the movable detector based on the directions of the respective optical signals.

11. A method for receiving optical signals in an optical sensing system, comprising:
 determining, by a controller, a plurality of target positions for receiving optical signals reflected or scattered from an object scanned by the optical sensing system, wherein the plurality of target positions are distributed within a physical range in a plane transverse to the optical signals according to a field of view of a receiver of the optical sensing system;
 moving, by an actuator controlled by the controller, a movable detector to a first target position among the plurality of target positions;
 receiving, by the movable detector, a first optical signal at the first target position in the transverse plane;
 moving, by the actuator controlled by the controller, the movable detector to a second target position among the plurality of target positions; and
 receiving, by the movable detector, a second optical signal at the second target position in the transverse plane.

12. The method of claim 11, wherein the first target position and the second target position are adjacent among the plurality of target positions.

13. The method of claim 11, wherein the optical sensing system is a Light Detection and Ranging (LiDAR) system and each optical signal is light reflected or scattered by the object.

14. The method of claim 11, wherein the actuator is a piezoelectric actuator or a high-speed motor, wherein the movable detector is one of an avalanche photodiode (APD), a silicon photomultipliers (SiPM), or a camera.

15. The method of claim 11, wherein the plurality of target positions are distributed in a two-dimensional plane, wherein the method further comprising:
 moving, by the actuator controlled by the controller, the movable detector in the two-dimensional plane according to a movement pattern.

16. The method of claim 11, wherein determining the plurality of target positions further comprises:
 determining a physical range according to a field of view of the receiver; and
 determining the target positions of the movable detector in the physical range.

17. An optical sensing system, comprising:
 a transmitter configured to emit optical signals in a plurality of directions to scan an object; and
 a receiver configured to detect optical signals reflected or scattered by the object, the receiver comprising:
  a movable detector configured to receive the optical signals;
  an actuator configured to move the movable detector; and
  a controller configured to control the actuator to move the movable detector to a plurality target positions distributed within a physical range in a plane transverse to the optical signals according to a field of view of the receiver for receiving the optical signals.

18. The optical sensing system of claim 17, wherein the controller is further configured to:
 determine return directions of the optical signals based on the plurality of directions of the emitted optical signals; and
 determine the target positions of the movable detector based on the return directions of the respective reelected optical signals.

* * * * *